United States Patent [19]

Clark

[11] 4,353,683

[45] Oct. 12, 1982

[54] STIRLING CYCLE ENGINE AND FLUID PUMP

[76] Inventor: Earl A. Clark, 1143 Manchester Ave., Norfolk, Va. 23508

[21] Appl. No.: 142,556

[22] Filed: Apr. 21, 1980

[51] Int. Cl.³ .......................... F04B 17/00; F02G 1/04
[52] U.S. Cl. ..................................... 417/379; 417/392; 417/400; 60/517
[58] Field of Search ................. 60/516, 517, 520, 682, 60/650; 417/379, 392, 400; 62/6

[56] References Cited

U.S. PATENT DOCUMENTS 3,415,442  12/1968  Stoddard et al. .................. 417/392
3,788,772  1/1974   Noble et al. ..................... 417/392 X
3,986,360  10/1976  Hagen et al. .................... 417/379 X Primary Examiner—Allen M. Ostrager
Attorney, Agent, or Firm—Griffin, Branigan & Butler

[57] ABSTRACT

A Stirling cycle engine is provided with a variable volume displacer piston for displacing a working fluid alternately between the hot and cold ends of the engine. The drive shaft for the displacer piston is hollow and communicates with the interior variable volume of the displacer piston. As the displacer piston volume increases it draws a fluid being pumped into the system through a check valve. As the volume of the displacer piston decreases the fluid being pumped is ejected under pressure through another check valve. Movement of the displacer piston is accomplished by mechanical or fluid programming and the power for driving the displacer piston may be derived from the fluid being pumped.

8 Claims, 7 Drawing Figures

STIRLING CYCLE ENGINE AND FLUID PUMP

RELATED APPLICATIONS

This application is related to my copending application Ser. No. 48,427 filed June 14, 1979 and entitled Heat Engine With Variable Volume Displacement Means.

BACKGROUND OF THE INVENTION

The present invention relates generally to fluid pumps and more particularly to a fluid pump wherein the pumping action is accomplished by a Stirling cycle engine having a variable volume displacer piston.

Stirling cycle engines have the desirable characteristic that heat from the sun, or otherwise waste heat, can be utilized as a source of power for driving the engine. In the past, where Stirling cycle engines have been utilized for pumping fluids, a common practice has been to provide a separate pump and means to drive the pump with the mechanical output power derived from the engine. This arrangement results in a larger than necessary engine and pump combination having a larger than necessary number of parts. The increased number of parts, and resulting mechanical friction undesirably reduce the working efficiency of the engine and pump combination.

BRIEF DESCRIPTION OF THE INVENTION

An object of the present invention is to provide a Stirling cycle engine and pump wherein no moving parts are required other than those utilized in the Stirling engine. An object of the present invention is to provide a Stirling cycle engine having a variable volume displacer piston, the displacer piston being mounted on a hollow shaft having an opening into the variable volume in the interior of the displacer piston and into a pumping chamber, whereby the pressure in the pumping chamber is varied as the variable volume alternately increases and decreases.

An object of the present invention is to provide a thermal pump comprising a Stirling cycle engine having a variable volume displacement piston driven by a hollow shaft having an opening communicating with the variable volume, means defining a first path for fluid flow into the hallow shaft and including a first check valve, and means defining a second path for fluid flow from the hollow shaft to an exit port and including a second check valve.

A further object of the invention is to provide a fluid pump comprising a housing enclosing a working volume, a variable volume displacement means disposed within the housing and dividing the working volume into first, second and third regions, the third region being defined within the variable volume displacement means and the first and second regions being interconnected so that substantially equal pressures may be maintained between them, a displacement means drive shaft slidably extending through the housing and attached to the variable volume displacement means, the shaft being hollow and having an opening communicating with the third region whereby a fluid being pumped is alternately driven in first one and then the other direction through the shaft as the variable volume displacement means increases and then decreases the third volume, means defining a pumping chamber, the displacement means drive shaft extending into the pumping chamber and having a second opening therein forming a flow path between the interior of the drive shaft and the pumping chamber, means for reciprocating the displacement means drive shaft, and means for admitting fluid to the pumping chamber, and outlet means permitting egress of fluid from the pumping chamber.

A further object of the invention is to provide a fluid pump as described above wherein the means for reciprocating the displacement means drive shaft includes means responsive to fluid pumped through said outlet means.

Other objects of the invention and its mode of operation will become apparent upon consideration of the following description and the accompanying drawing.

DETAILED DESCRIPTION OF PREFERRED EMBODIMENT

Figure 1:
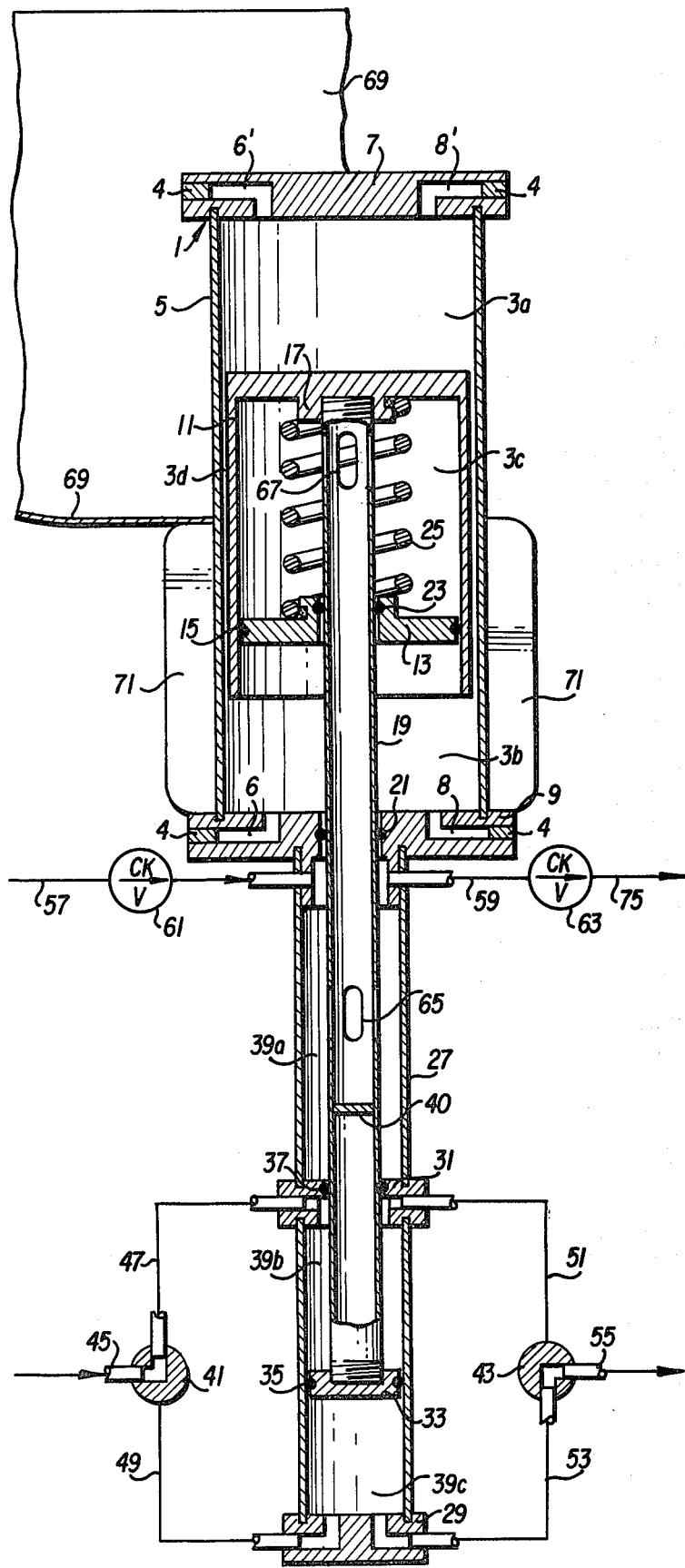
FIG. 1 is a part sectional view of a Stirling cycle engine and fluid pump constructed in accordance with the principles of the present invention.

As illustrated in FIG. 1, a Stirling cycle engine constructed in accordance with the principles of the present invention comprises a means such as a housing 1 defining a working chamber which is divided into a hot region 3a, a cold region 3b and a variable volume region 3c. The housing 1 may conveniently comprise a cylinder 5 having end walls 7 and 9.

A variable volume displacement means comprising a displacer piston 11 and a power piston 13 defines the variable volume 3c between the regions 3a and 3b. Displacer piston 11 is cylindrical in shape and fluid tight except for the bottom which may be open. As illustrated in FIG. 1, the outside diameter of displacer piston 11 is made smaller than the inside diameter of cylinder 5 by an amount such that the pressure remains substantially equal in regions 3a and 3b by permitting fluid flow through an annular passage 3d as the variable volume displacement means moves back and forth within the working chamber. Alternatively, plugs 4 may be removed from channels 6 and 6' and 8 and 8' and the channels connected together through a regenerator in a manner well known in the art.

The power piston 13 is disposed within the open end of displacer piston 11 and a sealing means 15 is mounted on the power piston to provide a sliding sealing engagement with the interior wall of the displacer piston.

The upper end wall of displacer piston 11 is provided with an internally threaded boss 17 for receiving the externally threaded end portion of a displacer drive shaft 19. The shaft extends through an opening in the power piston 13 and a further opening in the end wall 9. Sealing means 21 and 23 provide sliding seals between the shaft 19 and wall 9 and the shaft 19 and the power piston 13.

A compression spring 25 is attached at one end to the boss 17 and at the other end to power piston 13. The spring 25 serves to prevent piston 13 from falling out of piston 11, and further serves to drive piston 13 downwardly during one portion of an operating cycle, as subsequently described.

A housing 27 is attached at its upper end to the end wall 9. The lower end of housing 27 is capped by a cover member 29. Intermediate the ends of housing 27 is a partitioning means or plate 31 having a central opening therein. The displacer drive shaft 19 extends into housing 27 and through the hole in partitioning means 31, and has a displacer drive piston 33 attached to its lower end. Suitable sealing means 35 and 37 are provided on piston 33 and partitioning means 37 thereby dividing the interior of housing 27 into three separate fluid chambers 39a, 39b and 39c. The lower end of displacer drive shaft 19 may be solid or a plug 40 provided to seal off the lower end of a hollow shaft, thereby reducing what would otherwise be wasted working volume.

The variable volume displacement means, the drive shaft 19 and the displacer drive piston 33 may be moved alternately up and down by any suitable means. As illustrated in FIG. 1, this means includes first and second valves 41 and 43. Valve 41 has an inlet line 45 connected to a suitable source of pressurized fluid (not shown) and two outlet lines 47 and 49 connecting with the chambers 39b and 39c, respectively. Valve 43 has two inlet lines 51 and 53 connecting with the chambers 39b and 39c, respectively, and an exhaust outlet 55 which may be connected back to the low pressure side of the fluid source.

The valves 41 and 43 are actuated in synchronism so that when valve 41 connects the pressure source with chamber 39b, valve 43 exhausts chamber 39c, and when valve 41 connects the pressure source with chamber 39c, valve 43 exhausts chamber 39b. The valves may be actuated by any conventional means and for this reason the actuating means is not shown. By way of example, the valves may be actuated by mechanical, electrical, or other sensors or limit switches associated with shaft 19 or an extension thereof extending through cover member 29, the sensors actuating the valves when the variable volume displacement means reaches desired upper and lower limits of travel.

The Stirling cycle engine thus far described is adapted to produce a useful output by pumping a fluid. In order to accomplish the pumping action, an inlet line 57, from the source of fluid to be pumped, is connected through housing 27 to chamber 39a. The chamber 39a is connected to an outlet or discharge line 59. Check valves 61 and 63 are provided in lines 57 and 59, respectively, to insure unidirectional fluid flow. The drive shaft 19 is hollow and is provided with one or more ports 65 and one or more ports 67 connecting the interior of the shaft with chamber 39a and region 3c, respectively.

The region 3a is referred to as the hot end of the Stirling cycle engine because it is this region that is heated by an external source of heat. The heat source may be the direct rays of the sun in which case a suitable means such as a parabolic reflector 69 is provided for directing the rays against the upper end of housing 1. Obviously, the sun might heat a fluid medium which in turn heats the upper portion of housing 1, or such a fluid medium might be heated from other sources, preferably from sources where the energy might otherwise be wasted.

Region 3b is referred to as the cold end of the Stirling cycle engine because it is from this region that heat is extracted. In its simplest form the heat extracting means may comprise a plurality of fins 71 for conducting heat from housing 1 around the region 3b and radiating it to the surrounding air. Other conventional forms of heat exchangers may be used.

The working medium disposed within the regions 3a and 3b is preferably a gas such as Freon although other gases may be substituted therefor. The fluid medium which is pumped and the fluid for driving piston 33 may be either a gas or a liquid.

OPERATION OF PREFERRED EMBODIMENT

Figure 2:
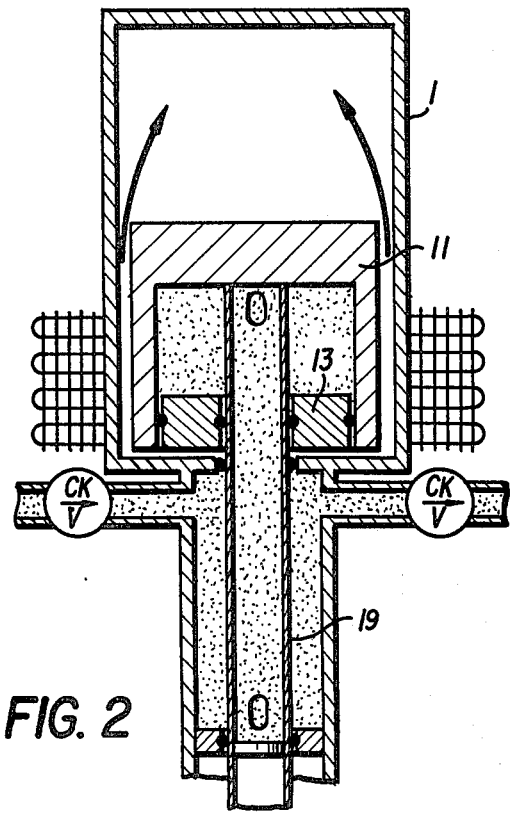
FIGS. 2–5 are schematic sectional views illustrating the positions of various parts of the invention during four different phases of a working cycle; and, FIGS. 6 and 7 are part sectional views of a second embodiment of the invention illustrating the relative locations of parts at two different points in a cycle of operation.

Assume that the valves 41 and 43 are moved to the positions shown in FIG. 1 whereby chamber 39b is pressurized to move the displacer drive piston 33 to its lowermost extent of travel. As the piston 33 moves downwardly it carries with it the shaft 19 and the variable volume displacement means including the displacer piston 11 and the power piston 13. During this interval the variable volume displacement means moves to the cold end of housing 1 and in doing so displaces the working fluid from this end of the housing to the hot end as illustrated by the arrows in FIG. 2.

Figure 3:
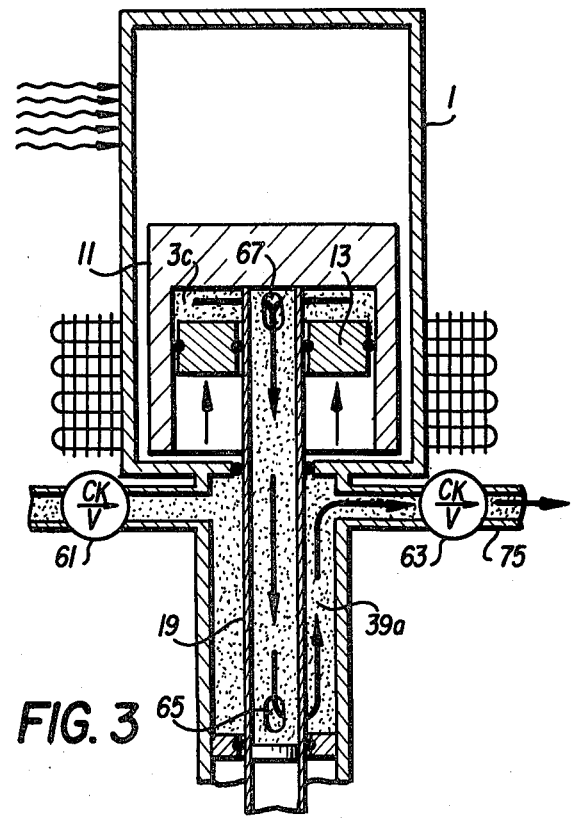

As illustrated in FIG. 3, heat applied to the hot end of the housing 1 heats the working fluid in the hot end of the housing and the working fluid expands thus forcing the power piston 13 upwardly against the force of spring 25 which is shown in FIG. 1 but not shown in FIGS. 2–5 for reasons of simplicity. As the expanding working fluid moves the power piston 13 upwardly within displacer piston 11, it forces fluid being pumped out of the region 3c through port 67 and into the interior of shaft 19. The pumped fluid exits from shaft 19 through port 65 and flows through chamber 39a and check valve 63 to the discharge line 75. During this interval check valve 61 prevents backflow of the pumped fluid from the chamber 39a to the fluid source.

When the power piston 13 reaches its uppermost limit of travel within displacer piston 11, valves 41 and 43 (FIG. 1) are reversed to pressurize chamber 39c and exhaust chamber 39c. The pressure acting on the lower face of drive piston 33 moves the piston and shaft 19 upwardly thus pushing displacer piston 11 upwardly. Because of the difference in pressures acting on the upper and lower surfaces of power piston 13, it moves upwardly along with the displacer piston.

Figure 4:
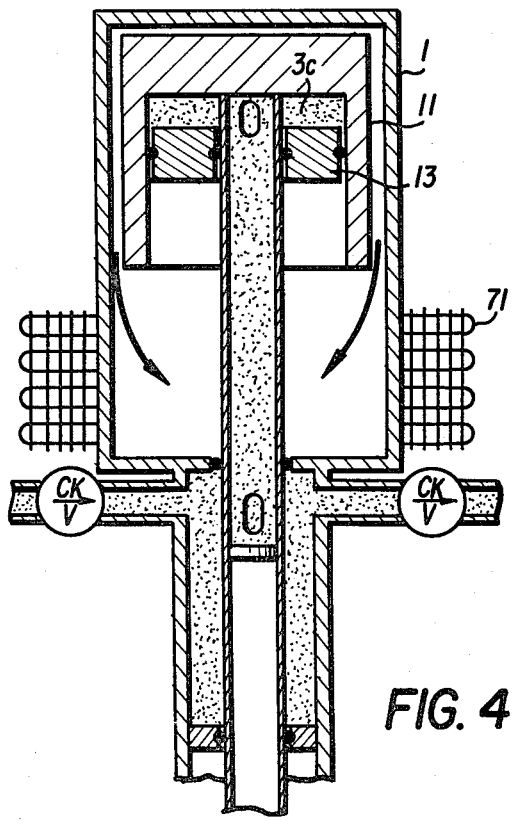

As the displacer piston is moved upwardly from the position shown in FIG. 3 to that shown in FIG. 4, it displaces the heated working fluid from the hot end of housing 1 to the cold end as indicated by the arrows in FIG. 4. As the working fluid enters the cold end of housing 1 it is cooled by fins 71 thus reducing the pressure within the housing 1. As the working fluid is cooled and the pressure reduced, the force of spring 25 (FIG. 1) moves power piston 13 downwardly from the position shown in FIG. 4 to that shown in FIG. 5. This creates a low pressure in the region 3c which draws the fluid being pumped in through check valve 61, chamber 39a, port 65, the interior of shaft 19 and port 67 to the region 3c. During this interval check valve 63 prevents back flow of the fluid being pumped from the exhaust line 75 back into chamber 39a.

Figure 5:
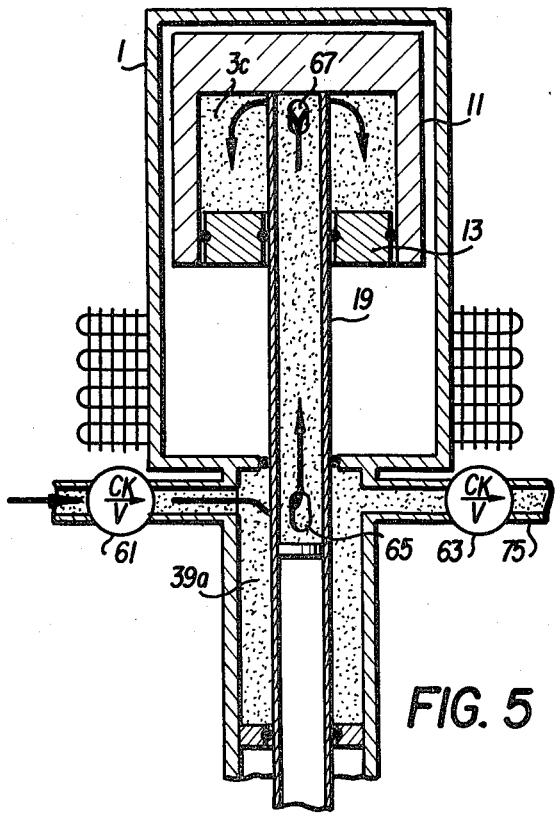

After spring 25 has fully extended itself to push power piston 13 to the position shown in FIG. 5, the valves 41 and 43 are actuated to pressurize chamber 39b and exhaust chamber 39c. This moves shaft 19, displacer piston 11 and power piston 13 downwardly from the position shown in FIG. 5 to that shown in FIG. 2, the working medium in the cold end of housing 1 being displaced to the hot end as the assembly is moved downwardly. This completes one cycle of operation of the engine and pump and it is ready to begin a second cycle.

ALTERNATIVE EMBODIMENT

Figure 6:
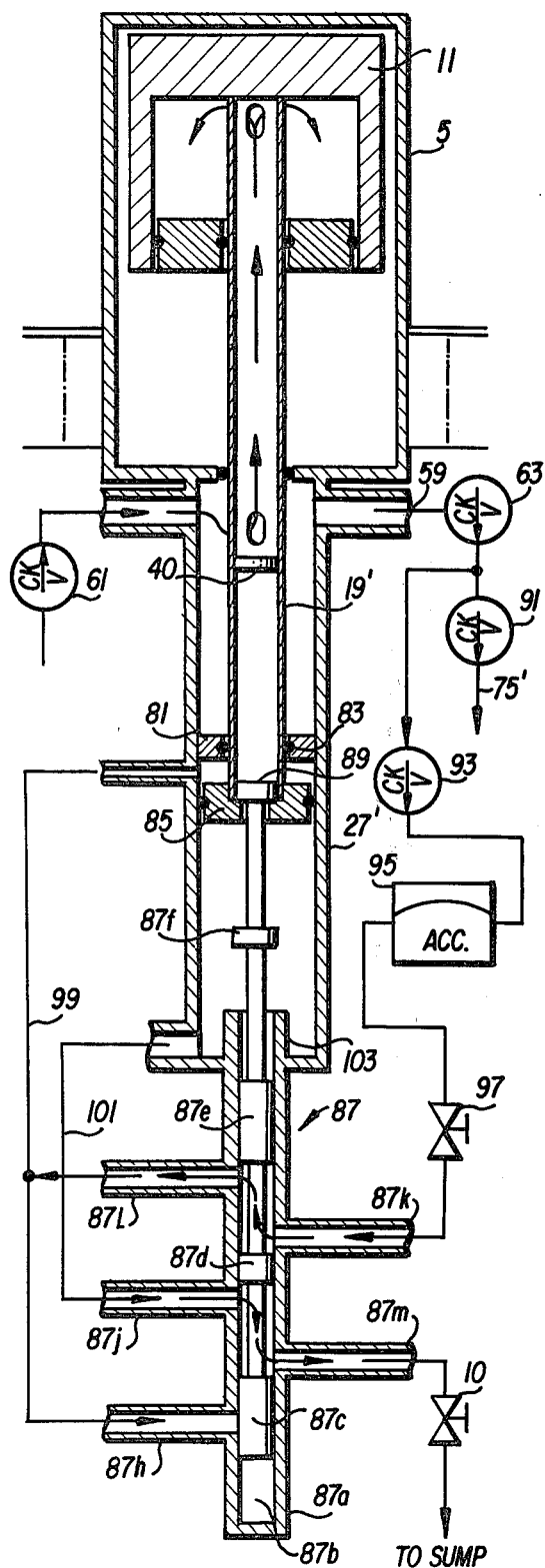
Figure 7:
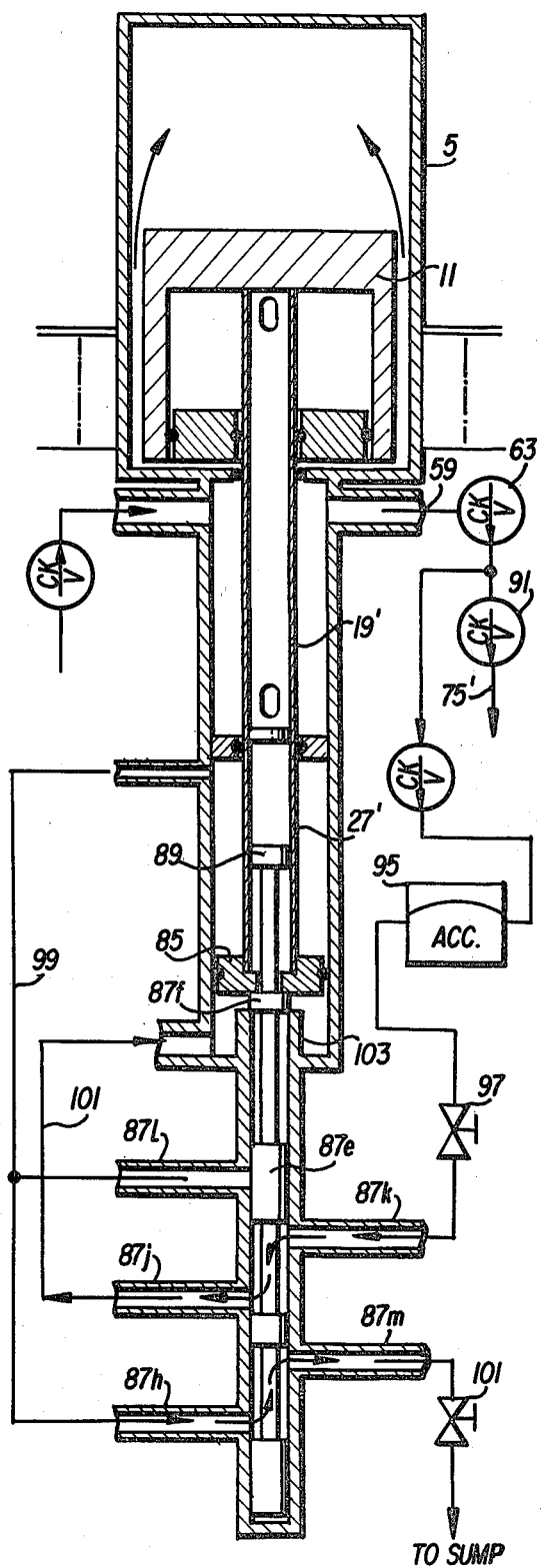

FIGS. 6 and 7 illustrate an alternative means for moving the displacer drive shaft. In this embodiment the displacer drive shaft 19' extends downwardly into a hollow housing 27'. The barrier seal 81 functions as a lower guide bearing for the shaft 19' and, in addition, prevents fluid being pumped from passing below the seal 81 into the lower portion of the housing 27'. A displacer piston 85 is attached to the lower end of shaft 19' and is provided with a central opening for receiving the shaft of a spool valve generally indicated at 87. A spool 89 of the spool valve is attached to the upper end of the spool valve shaft and is disposed within the displacer drive shaft 19' so as to operate within the shaft in the region below the plug 40.

The spool valve 87 includes a valve housing 87a which is attached to, or is formed with the housing 27' with the central bore 87b of the spool valve being in axial alignment with the displacer drive shaft 19'. Spool valve 87 is provided with spools 87c, 87d, 87e and 87f in addition to the spool 89. The spool valve has two inlet ports 87h and 87j and two outlet ports 87k and 87l.

The pump output line 59 is connected to a check valve 63 as in the previously described embodiment. The fluid being pumped passes through check valve 63 and a further check valve 91 to the output line 75'. A portion of the fluid being pumped passes through check valve 53 and a further check valve 93 to a pressure accumulator 95. The output of the pressure accumulator is connected through a throttle valve 97 to the input port 87k of the spool valve.

Ports 87h and 87L of the spool valve are connected to a fluid conduit 99 which in turn is connected to an inlet of housing 27' about the drive piston 85. Port 87j is connected by a fluid conduit 101 to a port in the housing 27' near the lower extent thereof. Port 87m is connected through a throttle valve 10 to a sump.

The embodiment illustrated in FIGS. 6 and 7 operates in exactly the same manner as the previous embodiment except for the manner in which the displacer shaft is driven. In the embodiment of FIGS. 6 and 7, the fluid being pumped is also utilized for operating the displacer piston shaft. A portion of the fluid being pumped passes through check valve 63 and check valve 93 for storage in pressure accumulator 95. The throttle valve 97 may be closed and, with check valve 93, store in accumulator 95 a pressure which may be utilized to restart the device.

Assume for example that the device is stopped with the piston 11 at its uppermost extent of travel within cylinder 5. The length of the shaft 19' is such that the displacer drive piston 85 is located just below the point where fluid conduit 99 connects with the interior of housing 27'. The spool valve 87 is at its uppermost extent of travel so that fluid flow paths are formed from port 87k through the valve to port 87L and from port 87j through the valve to port 87m. When the throttle valve 97 is opened the fluid pressure in accumulator 95 is released through port 87k, the spool valve, port 87L and fluid conduit 99 to pressurize the interior of housing 27' above the displacer drive piston 85. This drives the displacer drive piston downwardly thus moving the shaft 19' and the piston 11 downwardly. Fluid within the housing 27' below the drive piston 85 is released through fluid conduit 101, port 87j, the spool valve, port 87m and throttle valve 10 to the sump. The displacer drive piston 85 continues to move downwardly until it strikes the spool 87f. During this interval the shaft of the spool valve remains substantially stationary and the spool 89 rides up into the hollow interior of the displacer drive shaft 19'.

When the displacer drive piston 85 engages the spool 87f it drives the shaft of the spool valve downwardly until the spool 87f engages the upper surface of a stop 103 which is formed upwardly from the interior bottom of the housing 27'.

As illustrated in FIG. 7, when the spool 87f engages the stop 103 the piston 11 is at its lowermost extent of travel within the cylinder 5. Also, spool 87e blocks port 87L while flow paths are formed between ports 87k and 87j and between ports 87h and 87m. Therefore, the fluid pressure from the accumulator is passed through port 87k, the spool valve, port 87j and fluid conduit 101 to the volume within housing 27' which is below the displacer drive piston 85. The pressure drives the displacer piston 85 and thus shaft 19' and piston 11 upwardly while the spool valve shaft remains substantially stationary. During this interval the fluid within the housing 27' above the piston 85 passes over fluid conduit 99 and through port 87h, the spool valve, port 87m and throttle valve 10 to the sump.

As the piston 85 nears its upper limit of travel it engages the spool 89 thus moving the shaft of the spool valve 87 upwardly. This returns the spool valve 87 to the position shown in FIG. 6 thus completing one cycle of operation.

The throttle valve 101 is utilized as a speed control. This valve controls the downward rate of movement of the piston 85 by controlling the rate at which compressed fluid beneath the piston escapes to the sump through ports 87j and 87m. On upward movements of the piston 85 the throttle valve 101 controls the rate at which fluid under pressure above the piston 85 escapes to the sump through ports 87k and 87m.

The throttle valve 97 serves as an on-off control for the engine. By completely closing the valve 97 movement of the displacer drive piston 85 is completely stopped and the pumping action of the engine is halted. The engine resumes operation when the throttle valve 97 is opened provided the pressure stored in the accumulator is maintained throughout the interval the engine is not operating.

While specific preferred embodiments of the invention have been described in detail, it will be understood that various modifications, additions and substitutions may be made in the disclosed embodiments without departing from the spirit and scope of the invention as defined by the appended claims.

The embodiments of the invention in which an exclusive property or privilege is claimed are defined as follows:

1. A fluid pump comprising:
   a housing enclosing a working volume;
   a variable volume displacement means disposed within said housing and dividing said working volume into first, second and third regions, said third region being defined within said variable volume displacement means, and said first and second regions being interconnected so that substantially equal pressures may be maintained between them;

a displacement means drive shaft slidably extending through said housing and attached to said variable volume displacement means, said shaft being hollow and having an opening communicating with said third region whereby a fluid being pumped is alternately driven in first one and then the other direction through said shaft as said variable volume displacement means increases and decreases said third volume;

means defining a pumping chamber, said displacement means drive shaft extending into said pumping chamber and having a second opening therein forming a flow path between the interior of said drive shaft and said pumping chamber;

means for reciprocating said displacement means drive shaft;

inlet means for admitting fluid to said pumping chamber; and, outlet means permitting egress of fluid from said pumping chamber.

2. A fluid pump as claimed in claim 1 wherein said inlet means comprises first means terminating at a first opening into said pumping chamber and defining an input flow path and a first check valve disposed in said input flow path; and said outlet means comprises a second means terminating at a second opening into said pumping chamber and defining an output flow path and a second check valve disposed in said output flow path.

3. A fluid pump as claimed in claim 1 or claim 2 wherein said variable volume displacement means comprises:

a hollow displacer piston open at one end and attached at the other end to said drive shaft;

a power piston slidably surrounding said drive shaft and adapted to slide within said displacer piston; and, spring means disposed between said displacer piston and said power piston.

4. A fluid pump as claimed in claim 3 wherein said means for reciprocating said displacement means drive shaft comprises:

means defining a further chamber, said drive shaft extending through said pumping chamber and into said further chamber;

a displacer drive piston disposed within said further chamber and attached to said drive shaft; and, means for alternately applying a fluid pressure against first one and then the other face of said displacer drive piston to reciprocate it within said further chamber.

5. A fluid pump as claimed in claim 3 and further comprising:

means for applying heat to said first region; and, means for removing heat from said second region.

6. A fluid pump as claimed in claim 4 wherein said means for alternately applying a fluid pressure includes a pressure accumulator having an input connected to said outlet means; and means for alternately directing output pressure from said accumulator against first one and then the other face of said displacer drive piston.

7. A thermal pump comprising:

a housing defining an enclosed fixed volume for holding a working fluid;

a variable volume displacement piston disposed within said fixed volume and driven by a hollow shaft having an opening communicating with said variable volume, the variable volume within said displacement piston being decreased as the temperature of said working fluid is increased and increased as the temperature of said working fluid is decreased;

means defining a first path for pumped fluid flow into said hollow shaft, said first path including a first check valve;

means defining a second path for pumped fluid flow from said hollow shaft to an exit port, said second path including a second check valve; and, means for cycling the working fluid within said fixed volume in a Stirling cycle.

8. A thermal pump as claimed in claim 7 wherein the means for cycling said working fluid comprises:

means for heating the working fluid on one side of said displacement piston within said housing;

means for cooling the working fluid on the other side of said displacement piston within said housing; and, means for moving said displacement piston back and forth within said housing to move the working fluid alternately to one side of said displacement piston and then the other.

* * * * *